United States Patent
Artini et al.

(10) Patent No.: US 7,209,052 B2
(45) Date of Patent: Apr. 24, 2007

(54) METHOD AND DEVICE FOR DETERMINING A SAFE ALTITUDE FOR AN AIRCRAFT

(75) Inventors: Franck Artini, Toulouse (FR); Edward Strongman, Bretx (FR)

(73) Assignee: Airbus France, Toulouse (FR)

( * ) Notice: Subject to any disclaimer, the term of this patent is extended or adjusted under 35 U.S.C. 154(b) by 117 days.

(21) Appl. No.: 11/123,175

(22) Filed: May 6, 2005

(65) Prior Publication Data
US 2005/0258979 A1  Nov. 24, 2005

(30) Foreign Application Priority Data
May 18, 2004  (FR) .................................. 04 05385

(51) Int. Cl.
*G08B 23/00* (2006.01)
(52) U.S. Cl. ..................... 340/970; 340/947; 340/951; 701/4; 701/301
(58) Field of Classification Search .............. 340/970, 340/961, 947, 951, 977, 979; 701/4, 14, 701/301; 244/183
See application file for complete search history.

(56) References Cited
U.S. PATENT DOCUMENTS

| | | | |
|---|---|---|---|
| 5,638,282 A | 6/1997 | Chazelle et al. | |
| 5,922,031 A | 7/1999 | Larrieu | |
| 6,088,654 A | 7/2000 | Lepere et al. | |
| 6,456,940 B1 * | 9/2002 | Higgins | ........................ 701/301 |
| 6,508,435 B1 * | 1/2003 | Karpov et al. | .................. 244/2 |
| 7,064,680 B2 * | 6/2006 | Reynolds et al. | ........... 340/961 |
| 7,126,534 B2 * | 10/2006 | Smith et al. | ................. 342/456 |

FOREIGN PATENT DOCUMENTS

| | | |
|---|---|---|
| FR | 2741320 | 5/1997 |
| WO | 0031564 | 6/2000 |

* cited by examiner

*Primary Examiner*—Davetta W. Goins
(74) *Attorney, Agent, or Firm*—Stevens, Davis, Miller & Mosher, LLP

(57) ABSTRACT

A method and device for determines a safe altitude for an aircraft. The device includes a unit that determines a clear zone corresponding to a lateral area dependent on the flight of the aircraft. A unit determines the highest altitude of the ground that is located under this clear zone. A unit determines a safe altitude, by calculating the sum of the aforementioned highest altitude and a guard height.

21 Claims, 4 Drawing Sheets

METHOD AND DEVICE FOR DETERMINING A SAFE ALTITUDE FOR AN AIRCRAFT

FIELD OF THE INVENTION

The present invention relates to a method and a device for determining a safe altitude for an aircraft, in particular a military transport airplane.

Although not exclusively, the present invention applies more particularly to an aircraft flying at low altitude.

BACKGROUND OF THE INVENTION

In such a low-altitude flight, emergency situations may occur (following a failure or because of an operational need, for example), for which the aircraft must be brought immediately to a high altitude, where it is safe and where there is no longer any risk of collision with the ground.

SUMMARY OF THE INVENTION

The subject of the present invention is a method for determining a safe altitude for an aircraft, at which the latter can fly in complete safety with no risk of collision with the ground.

To this end, according to the invention, said method is noteworthy in that:
a) a clear zone is determined, corresponding to a lateral area defined in the lateral plane of the aircraft and linked to the flight of said aircraft;
b) the highest altitude of the ground that is located under this clear zone is determined; and
c) the safe altitude is determined as the sum of said highest altitude determined in step b) and a guard height.

Furthermore, advantageously, in step d), at least said safe altitude is presented to a pilot of the aircraft.

Thus, with the invention, the safe altitude at which the aircraft can fly in complete safety, with no risk of collision with the ground, is known.

Furthermore, advantageously, said guard height is a predetermined height, which can be modified by an operator. Preferably, said guard height is around 1000 feet (approximately 300 meters).

In a first embodiment applied to an aircraft which flies (that is, which is guided) along a predetermined flight path comprising a lateral path provided with waypoints, advantageously, said clear zone is linked to said lateral path.

In this case, advantageously:
said clear zone includes at least one rectangular area which is centered laterally relative to a straight-line segment linking two successive waypoints and which is defined at least on a part of said straight-line segment. Preferably, said clear zone includes a plurality of such adjacent rectangular areas; and/or
said clear zone includes a circle at at least one waypoint. In this latter case, advantageously:
in a first variant, said circle is centered on said waypoint; and
in a second variant, said circle is centered on a point of intersection of two successive straight-line segments associated with said waypoint, when the flight at said waypoint presents an obligation to fly over the latter.

Moreover, in a second embodiment applied to an aircraft which is in free flight (that is, which is not automatically guided by an automatic pilot or a flight director system on a predetermined path) in particular a flight in visual flight conditions, advantageously, said clear zone is linked to the current position of the aircraft.

In this case, advantageously:
in a first variant, said clear zone presents a length which corresponds to a predetermined flight time of the aircraft at the current speed; and
in a second variant, said clear zone presents a length which depends on a longitudinal scale on a visual display screen on the aircraft.

Furthermore, advantageously, said clear zone presents a width which takes into account an uncertainty concerning said current position of the aircraft.

In a particular embodiment, said clear zone is conical in shape, to favor turns (lateral maneuvers).

Furthermore, advantageously, said clear zone can be modified by an operator, in particular in mission preparation (on the ground).

Moreover, advantageously, the following operations are also carried out:
a control area is determined, defined laterally by said clear zone and vertically by said safe altitude; and
each point of said control area is checked to ensure that it is located at at least a particular height (corresponding to said guard height), above the ground.

Furthermore, advantageously, a safe altitude profile is determined, taking into account any variation in the safe altitude at least forward of the current position of the aircraft, with the appropriate delay before the change of altitude.

The present invention also relates to a device for determining a safe altitude for an aircraft, in particular a military transport airplane.

According to the invention, said device is noteworthy in that it includes:
means for determining a clear zone corresponding to a lateral area dependent on the flight of the aircraft;
means for determining the highest altitude from the ground that is located under said clear zone; and
means for determining the safe altitude, by calculating the sum of said highest altitude and a guard height.

In a preferred embodiment, said device also includes:
means of display for presenting at least said safe altitude on at least one display screen; and/or
means for controlling said safe altitude, in other words, in flight, the guard height and, on the ground, in mission preparation, the dimensions of the clear zone.

The device according to the invention therefore provides valuable help in piloting, by indicating in particular the (safe) altitude at which the aircraft can fly in complete safety.

How the invention can be produced will be clearly understood from the figures of the appended drawing. In these figures, identical references denote similar elements.

DETAILED DESCRIPTION OF THE INVENTION

Figure 1:
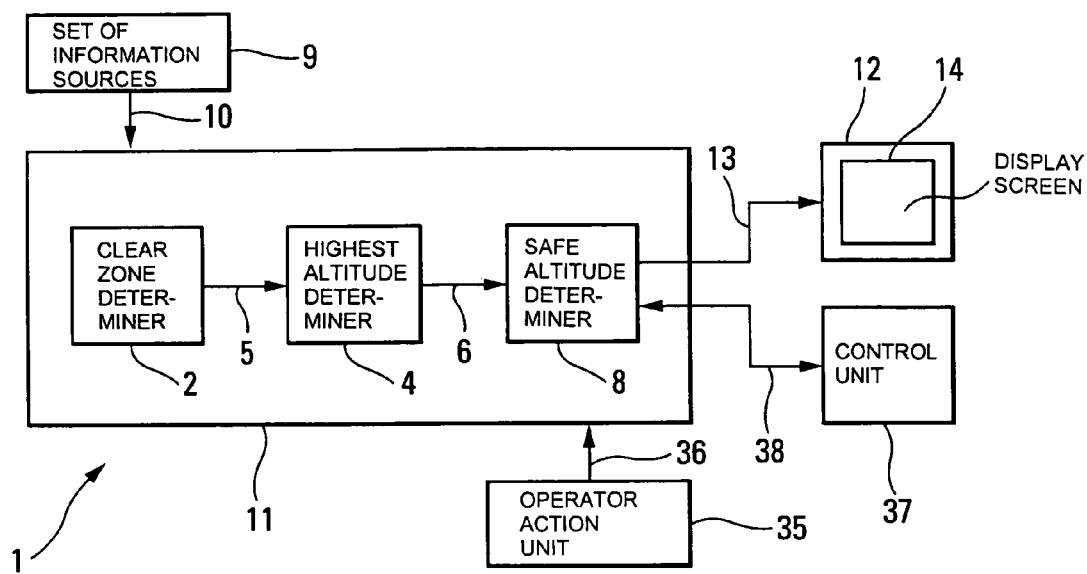
FIG. 1 is the block diagram of a device according to the invention.

The device 1 according to the invention and diagrammatically represented in FIG. 1 is a device to assist in the piloting of an aircraft A, in particular a military transport airplane. The particular object of this device 1 is to determine a safe altitude AS for the aircraft A.

For this, said device 1 includes, according to the invention:
- means 2 for determining a clear zone 3 corresponding to a lateral area (located in a horizontal plane) dependent on the flight of the aircraft A, as detailed below;
- means 4 which are linked by a link 5 to said means 2 for determining the highest altitude AO of the part 7a of the ground 7, which is located under said clear zone 3. This part 7a of the ground 7 corresponds to the vertical projection on said ground 7 of said clear zone 3; and
- means 8 which are linked by a link 6 to said means 4, for determining the safe altitude AS as the sum of said highest altitude AO and a guard height HG.

In a particular embodiment, said device 1 also includes:
- a set 9 of information sources, detailed below, which is linked by a link 10 to a central processing unit 11 combining said means 2, 4 and 8; and
- display means 12 which are linked by a link 13 to said means 8 and which are designed to present at least said safe altitude AS on at least one display screen 14.

Said display screen 14 may be a head-up display (HUD) or a head-down display. It may also show a horizontal display or a vertical display (that is, in cross section).

Thus, with the device 1 according to the invention, the pilot knows exactly the altitude (safe altitude AS) to which he must bring the aircraft A in order to be able to fly in complete safety, in particular in emergency situations, for example following a failure or because of an operational need. At this safe altitude AS, there is no longer any risk of collision with the ground 7 for the aircraft A.

It will be noted that the guard height HG which is, for example, supplied by the set 9 of information sources, is preferably a predetermined height, for example around 1000 feet (approximately 300 meters). Furthermore, in a particular embodiment, this predetermined height can be modified by an operator, in particular a pilot of the aircraft A.

Although not exclusively, the present invention applies more particularly to a low-altitude flight of an aircraft A, for which the risk of collision with the ground 7 is obviously enhanced. In such a low-altitude flight, in the event of problems, it is sufficient for the pilot to bring the aircraft A to said safe altitude AS to avoid any collision with the ground 7, and this, in particular, in emergency situations.

Figure 2:
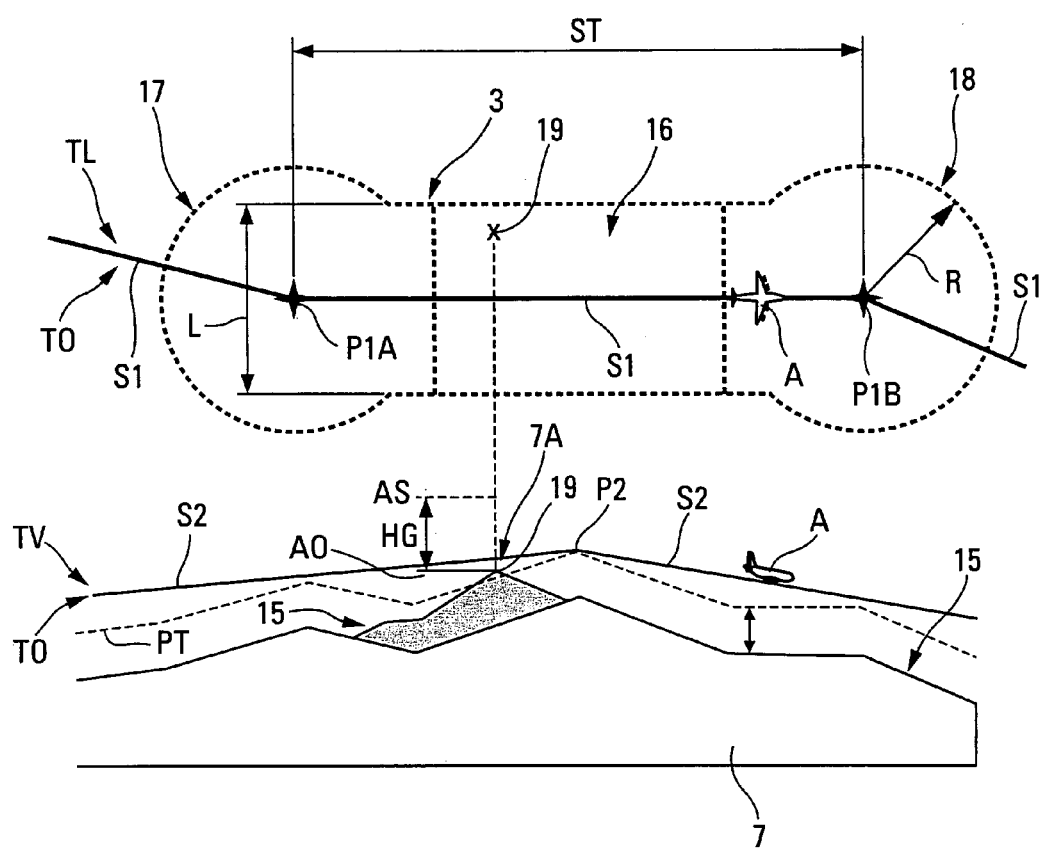
FIG. 2 is a graphic in two parts for clearly explaining the present invention in the case of a flight along a predetermined flight path.

In a first embodiment represented in FIGS. 2 to 5, the device 1 applies to an aircraft A which flies along a predetermined flight path TO (planned in mission preparation, in particular) comprising a lateral path TL provided with waypoints P1A, P1B, as represented in the top part of FIG. 2, and a vertical path TV represented in the bottom part of FIG. 2.

In this case, in a preferred variant, said flight path TO is a "length of string" path, in which the lateral path TL located in the lateral plane is made up of straight-line segments S1 which interlink the various waypoints P1A, P1B, and for which the vertical path TV located in the vertical plane comprises successive straight-line segments S2 joining at points P2. It will be noted that the flight path TO can also include a lateral path TL as specified above, and a vertical path TV which represents a continuous curve. Preferably, the lateral and vertical transitions between the various straight-line segments S1, S2 are arcs of constant radius, which are calculated by considering set-point speed and maximum allowable load factors. This flight path TO is an anticipated path, determined using predicted ascent and descent performance characteristics of the aircraft A. Furthermore, it is calculated using a digital database of the ground or a radar which extracts the digital profile and it follows, as best it can and as closely as possible, the relief configuration 15 of the ground 7 to be flown over, being, for example, located above a ground profile PT.

In the first embodiment represented in FIGS. 2 to 5, for which the aircraft A is guided (in particular automatically) along said predetermined flight path TO, said clear zone 3 is linked to said lateral path TL of the flight path TO, as represented, for example, in the top part of FIG. 2.

In the example of FIG. 2, the clear zone 3 includes, on a path section ST defined between two successive waypoints P1A and P1B, a plurality of individual areas, in other words:
- a rectangular area 16 which is centered laterally relative to the straight-line segment S1 linking these two successive waypoints P1A and P1B and which presents a width L; and
- two circles 17 and 18, of radius R, which are respectively provided at said waypoints P1A and P1B and which are linked to the rectangular area 16. These circles are used to provide an additional margin in the turns where the guidance of the aircraft A may be less effective (lateral deviations).

In this case, in a first simplified variant, the clear zone 3 can encompass the various individual areas 16, 17 and 18, such that the highest altitude of all of the ground 7 which is located under this overall clear zone 3 is then sought. On the other hand, in a second, more specific variant, the invention can be implemented for each of these individual areas 16, 17 and 18 which then each in turn become a clear zone, under which the highest altitude of the ground 7 is then determined.

In FIG. 2, the highest peak 19, of altitude AO, which is located under the individual clear zone 16, is represented. The safe altitude AS therefore corresponds to the sum of this altitude AO and of the guard height HG.

Figure 3:
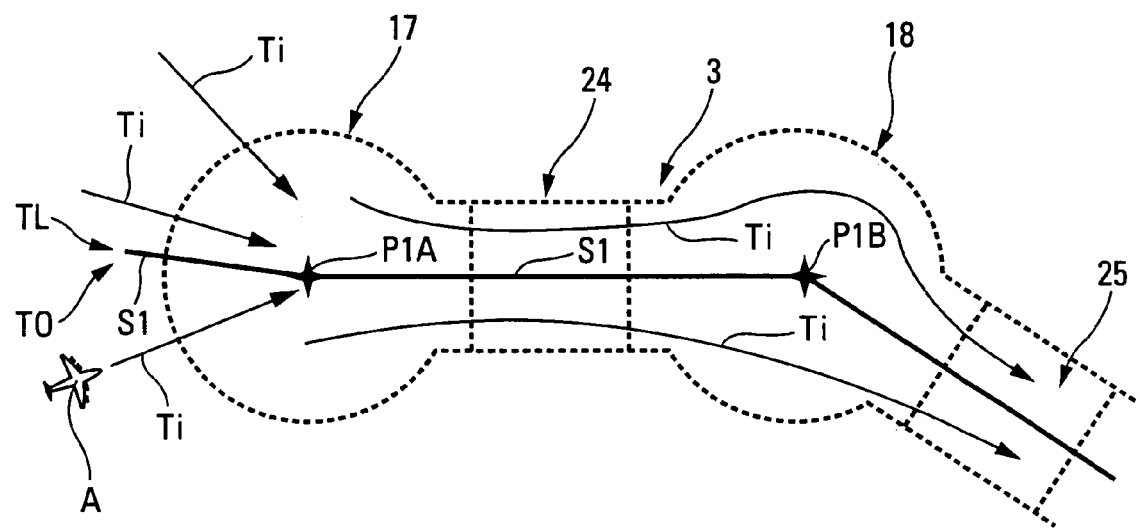

It will be noted that the circles 17 and 18 can be used to safeguard the flight of the aircraft A at said waypoints P1A and P1B, in the case where the path actually followed by the aircraft A and illustrated by possible path sections Ti in FIG. 3, deviates a little from the planned lateral path TL. This safeguards the rotation at a waypoint P1A, P1B, the arrival at the first waypoint P1A of the section ST, and the exit from the section ST at the second waypoint P1B.

Figure 4:
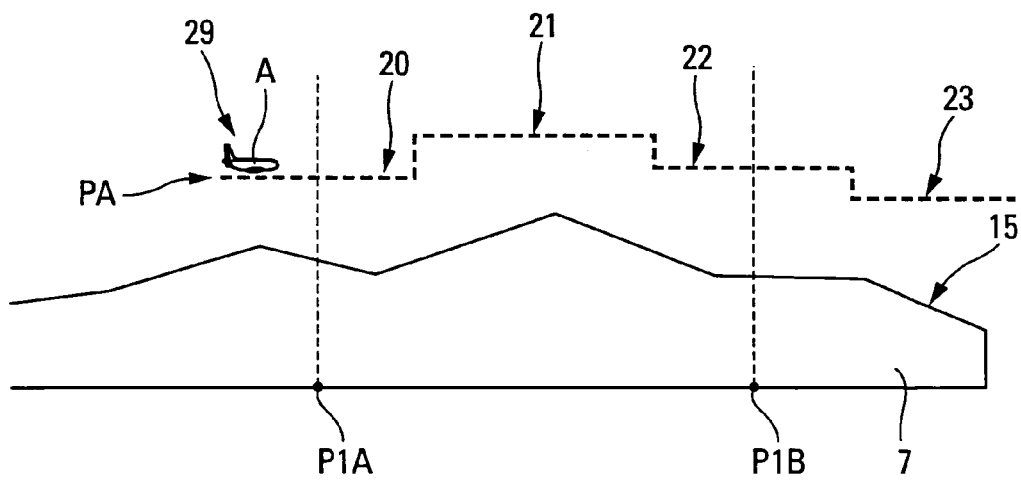

In a particular embodiment, the means 8 do not determine only a safe altitude AS, but also a safe altitude profile PA which takes into account any variation of the safe altitude AS at least forward of the current position 29 of the aircraft A, as represented in FIG. 4 which corresponds to the example of FIG. 3. The fineness of the breakdown of FIG. 3 represents, preferably, a trade-off between the frequency of the changes of safe altitude AS and the effectiveness (it will be noted that, if the clear zones are too wide, the aircraft A may fly high relative to the highest point, which reduces operational effectiveness, in particular in military missions).

Said safe altitude profile PA includes a plurality of levels 20, 21, 22 and 23 which define a safe altitude AS respectively associated with the successive clear zones represented in FIG. 3, in other words the circle 17, a square 24, the circle 18 and a square 25. In the example of FIG. 4, the aircraft A is located just above the level 20 of the safe altitude profile PA.

Figure 5:
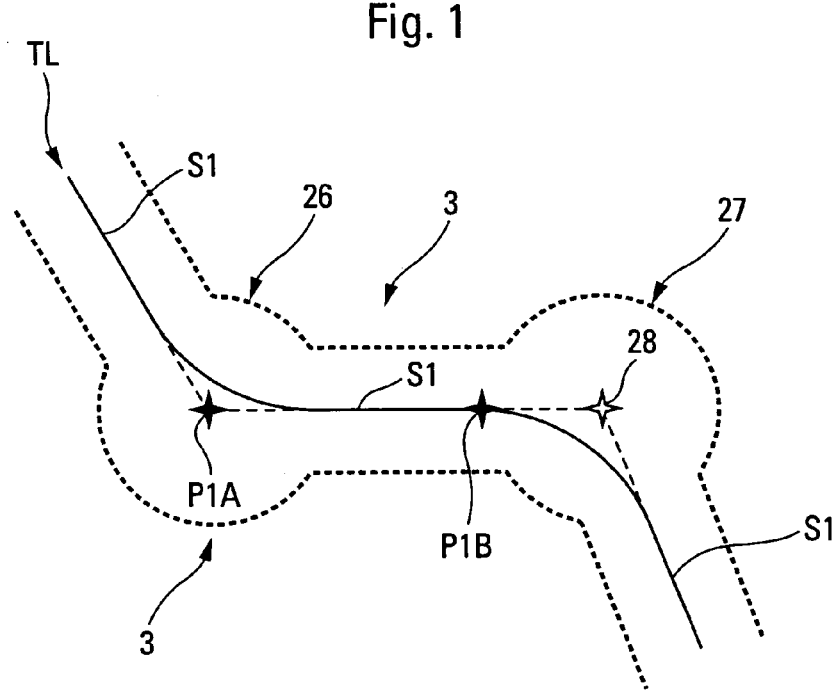
FIGS. 3 to 5 are graphics applied to the case of FIG. 2.

It will also be noted that it is known that to each waypoint P1A, P1B can be linked a condition relating to the flying-over of this waypoint P1A, P1B, which can correspond:

either to an obligation to anticipate the overflight, as represented for the waypoint P1A in FIG. 5;

or an obligation to fly over this waypoint, as represented for the waypoint P1B in FIG. 5.

In this case, preferably, the clear zone 3 is such that:

for the waypoint P1A, the corresponding circle 26 is centered on this waypoint P1A;

for the waypoint P1B, the corresponding circle 27 is centered on a point of intersection 28 of the two successive straight-line segments S1 which are associated with said waypoint P1B, which effectively protects the effective path of the aircraft A.

It will be noted that the safe altitude AS does not only provide the crew with a safe altitude, but it enables it also to anticipate the safe altitude profile PA along the flight path TO.

Figure 6:
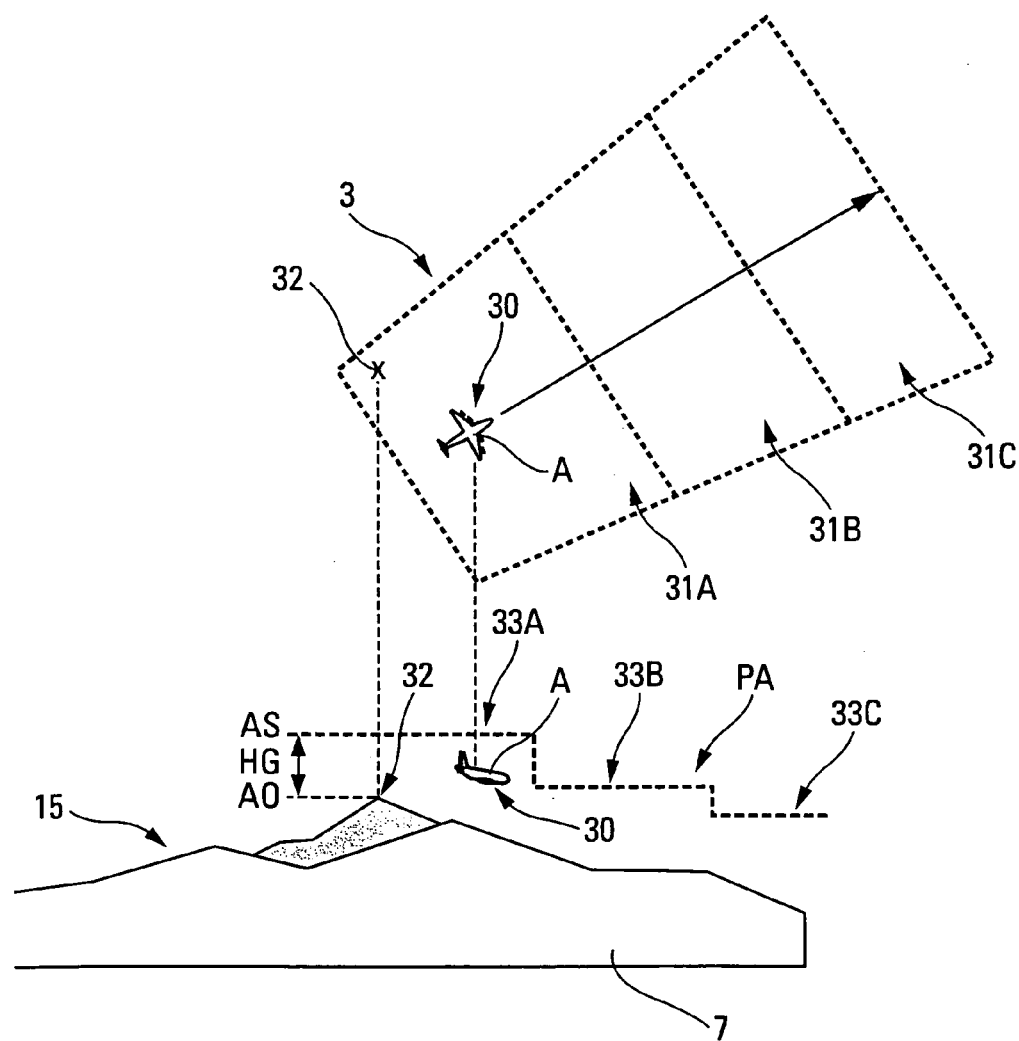
FIG. 6 is a graphic in two parts for clearly explaining the present invention in the case of a free flight.

Moreover, in a second embodiment, for which no automatic guidance mode of the aircraft A is engaged, that is, for which the aircraft A is in free flight, with no automatic pilot system or with no flight director system, in particular in visual meteorological conditions (VMC), the clear zone 3 is linked to the current position 30 of the aircraft, as represented in FIG. 6.

In this case, the clear zone 3 presents, for example, a conical shape or a trapezoidal shape (in particular to anticipate the turns), as represented in the top part of FIG. 6 relating to the lateral plane. In this FIG. 6, the clear zone 3 has three individual zones 31A, 31B and 31C, adjacent in the direction of flight. The highest altitude AO under the zone 31A corresponds to a peak 32.

Thus, taken individually, the different clear zones 31A, 31B and 31C are used to create a safe altitude profile PA comprising levels 33A, 33B and 33C respectively associated with said individual clear zones 31A, 31B and 31C. These clear zones are therefore defined around the position of the aircraft A.

In the example of FIG. 6, the flight path (illustrated by an arrow forward of the aircraft A) is a straight-line path of fixed length or corresponding to a certain flight time at the current speed of the aircraft A, and which is linked to the axis of said aircraft A (and therefore moves with the latter).

In a preferred embodiment, said clear zone 3 presents a width which takes into account an uncertainty concerning the current position 30 of the aircraft A. Furthermore, said clear zone 3 presents a length:

which corresponds to a predetermined flight time of the aircraft A at the current speed; or which depends on a longitudinal scale of a visual display screen on the aircraft A, in particular of the screen 14.

Moreover, the device 1 according to the invention also has, as represented in FIG. 1:

means 35 which are linked by a link 36 to the central processing unit 11, and which enable an operator, in particular a pilot of the aircraft A, to act on the method implemented by the central processing unit 11, in particular to modify said clear zone 3; and means 37 which are linked by a link 38 to said central processing unit 11 and which are used to control said safe altitude AS.

For this, said means 37:

determine a control area (not represented) which is defined laterally by said clear zone 3 and vertically by said safe altitude AS; then check that each individual point or zone (presenting a certain area) of said control area is located at at least a predetermined height (corresponding to said guard height HG) above the ground 7.

In a particular embodiment, said set 9 of information sources provides the central processing unit 11, with at least some of the following information:

the flight path TO, in the embodiment of FIGS. 2 to 5;

a set of data for determining the clear zone 3 linked to this flight path TO;

the state vector of the aircraft A, used in particular to define its current position 29, 30; and a set of data for defining the clear zone 3 linked to the current position 30 of the aircraft A, in the embodiment of FIG. 6.

The invention claimed is:

1. A method for determining a safe altitude for an aircraft, said method comprising:

a) defining a clear zone, corresponding to a lateral area defined in the lateral plane of the aircraft and linked to the flight of said aircraft;

b) determining the highest altitude of the ground that is located under this clear zone; and c) determining the safe altitude as the sum of said highest altitude determined in step b) and a guard height, wherein the following operations are carried out:

determining a control area, defined laterally by said clear zone and vertically by said safe altitude; and checking each point of said control area to ensure that it is located at at least a height corresponding to said guard height, above the ground.

2. The method as claimed in claim 1, wherein, furthermore, in step d), at least said safe altitude is presented to a pilot of the aircraft.

3. The method as claimed in claim 1, wherein said guard height is a predetermined height, which can be modified by an operator.

4. The method as claimed in claim 1, wherein said guard height is around 300 meters.

5. The method as claimed in claim 1, for an aircraft flying along a predetermined flight path comprising a lateral path provided with waypoints (P1A, P1B), wherein said clear zone is linked to said lateral path.

6. The method as claimed in claim 5, wherein said clear zone has at least one rectangular area (16, 24, 25) which is centered laterally relative to a straight-line segment linking two successive waypoints (P1A, P1B) and which is defined at least over a part of said straight-line segment.

7. The method as claimed in claim 6, wherein said clear zone has a plurality of adjacent rectangular areas.

8. The method as claimed in claim 5, wherein said clear zone includes a circle (17, 18, 26, 27) at at least one of said waypoints (P1A, P1B).

9. The method as claimed in claim 8, wherein said circle (17, 18, 26) is centered on said waypoints (P1A, P1B).

10. The method as claimed in claim 8, wherein said circle (27) is centered on a point of intersection of two successive straight-line segments associated with said waypoint (P1B), when the flight at said waypoint (P1B) presents an obligation to fly over the latter.

11. The method as claimed in claim 1, for an aircraft which is in free flight, wherein said clear zone (3) is linked to the current position of the aircraft.

12. The method as claimed in claim 11, wherein said clear zone presents a length which corresponds to a predetermined flight time of the aircraft at the current speed.

13. The method as claimed in claim 11, wherein said clear zone presents a length which depends on a longitudinal scale of a display screen on the aircraft.

14. The method as claimed in claim 11, wherein said clear zone presents a width which takes into account an uncertainty concerning said current position of the aircraft.

15. The method as claimed in claim 11, wherein said clear zone presents a conical shape.

16. The method as claimed in claim 1, wherein said clear zone can be modified by an operator.

17. The method as claimed in claim 1, wherein a safe altitude profile is determined, taking into account any variation of the safe altitude at least forward of the current position of the aircraft.

18. A device for determining a safe altitude for an aircraft, said device comprising:
   means for determining a clear zone corresponding to a lateral area dependent on the flight of the aircraft;
   means for determining the highest altitude of the ground that is located under this clear zone; and
   means for determining the safe altitude, by calculating the sum of said highest altitude and a guard height, which also includes, to control said safe altitude, means which determine a control area defined laterally by said clear zone and vertically by said safe altitude and which check that each point of said control area is located at at least a height corresponding to said guard height, above the ground.

19. The device as claimed in claim 18, which also includes display means for presenting at least said safe altitude on at least one display screen.

20. An aircraft, which includes a device such as the one specified in claim 18.

21. An aircraft, which includes a device for implementing the method specified in claim 1.

* * * * *